United States Patent [19]
Hall et al.

[11] Patent Number: 5,472,044
[45] Date of Patent: Dec. 5, 1995

[54] METHOD AND APPARATUS FOR INTERACTING A GAS AND LIQUID ON A CONVOLUTED ARRAY OF TUBES

[75] Inventors: Nelson L. Hall, Houston, Tex.; John F. Imbalzano, Elkton, Md.; Randall E. McCrory, Maggie Valley, N.C.

[73] Assignee: E. I. Du Pont de Nemours and Company, Wilmington, Del.

[21] Appl. No.: 160,707

[22] Filed: Nov. 24, 1993

Related U.S. Application Data

[63] Continuation of Ser. No. 139,475, Oct. 20, 1993, abandoned.

[51] Int. Cl.$^6$ .................................................. A23C 3/04
[52] U.S. Cl. ..................... 165/115; 165/180; 165/104.32; 165/111
[58] Field of Search ....................... 165/104.21, 104.32, 165/158, 163, 111, 115, 117, 118, 914; 261/153, 155; 138/145, DIG. 3

[56] References Cited

U.S. PATENT DOCUMENTS

| | | | |
|---|---|---|---|
| 1,494,989 | 5/1924 | Bregeat | 210/800 |
| 2,192,124 | 2/1940 | Brill et al. | 23/1 |
| 2,316,564 | 4/1943 | Cockerill | 165/115 |
| 3,228,456 | 1/1966 | Brown et al. | 165/1 |
| 3,364,982 | 1/1968 | Jaffe | 165/1 |
| 3,419,069 | 12/1968 | Baker et al. | 165/158 |
| 3,437,124 | 4/1969 | Bryan et al. | 165/115 |
| 3,894,133 | 7/1975 | Coste | 261/155 |
| 4,271,900 | 6/1981 | Reitz | 165/163 |
| 4,753,286 | 6/1988 | Herbst | 165/46 |
| 4,909,318 | 3/1990 | Ymes | 165/145 |
| 4,925,526 | 5/1990 | Havukainen | 165/115 |
| 4,925,710 | 5/1990 | Buck et al. | 138/DIG. 3 |
| 4,969,507 | 11/1990 | Rosenblad | 165/115 |

FOREIGN PATENT DOCUMENTS

| | | |
|---|---|---|
| 2526146 | of 0000 | France . |
| WO9207639 | 5/1992 | WIPO . |

OTHER PUBLICATIONS

Chemical Equipment Div. (Haveg Industries, Inc.), HCL Absorption Falling Film, Hav. 24452 8–78 500 pp, 2 pages, 1978.

Norton, Model 798 Metal Weir–Riser Distributor 12"–47¾", 1 page, 1977.

Norton, Model 844 Metal Ladder Type Distributor 17¼" & larger, 1 page, 1976.

Primary Examiner—John Rivell
Assistant Examiner—Christopher Atkinson
Attorney, Agent, or Firm—Edwin Tocker

[57] ABSTRACT

A fluid medium such as a gas and a liquid medium are interacted within a convoluted array of tubes, wherein the liquid medium is present as "rain-fall" rather than flooding the array of tubes, with a heat transfer medium being passed through the tubes to heat or cool the liquid medium, as the case may be, to drive the mass transfer occurring in the interaction between gas and liquid medium.

23 Claims, 4 Drawing Sheets

METHOD AND APPARATUS FOR INTERACTING A GAS AND LIQUID ON A CONVOLUTED ARRAY OF TUBES

This application is a continuation of patent application Ser. No. 08/139,475, now abandoned, filed Oct. 20, 1993.

BACKGROUND OF THE INVENTION

This invention relates to a method and apparatus useful for interacting a liquid with a fluid medium, such as a gas, and exchanging heat with the liquid where the heat exchange aids in driving the interaction by either removing or adding heat. The invention particularly relates to a method and apparatus where the liquid absorbs components from a gas and a heat of absorption must be removed to aid in driving the absorption process.

Devices are known for absorbing components from a gas and cooling the absorbing solution. One such device for absorbing an acid solution uses impervious carbon or graphite tubes for the fluid conduits to support a falling film of the liquid and a passage for the gas on the inside of the tubes. The outside of the robes is exposed to a heat transfer medium. These tubes have been found to be sensitive to thermal and mechanical shock, and may sometimes require expensive replacement. For such devices to process large flow rates of liquid and gas, the devices must be rather large and bulky, or multiple units may be required. Conventional heat exchange devices are known for cooling a liquid that floods a chamber that contains a braided robe array through which is circulated a cooling fluid. These heat exchangers are not designed to work efficiently when the fluid does not flood the chamber, and they do not have means to establish and maintain a mixture of liquid and gas while removing heat from the mixture.

Some other heat exchange devices designed for gas-to-liquid interaction are often made of materials that may be subject to corrosion and fouling, especially if strong acid solutions are involved. To avoid corrosion which may contaminate the process fluids, expensive, non-corroding metals are sometimes used.

There is a need for a simple, fluid medium/liquid interaction device that processes a high flow rate of liquid and fluid medium, such as a gas, with high productivity in a compact assembly. There is a need for a gas/liquid interaction device that has a low prorated cost and that has long maintainance intervals and is simple and inexpensive to maintain. There is a need for a gas/liquid interaction device that is rugged in an industrial environment and can withstand sudden temperature changes and mechanical shock without catastrophic damage, and there is a need for such a device incorporating relatively inexpensive materials that are insensitive to most corrosive industrial chemicals.

SUMMARY OF THE INVENTION

The invention is a method for interacting a fluid medium and a liquid that features separating the liquid into discrete volumes; distributing the volumes over the cross-section of an interaction chamber; passing the volumes down over the outside surfaces of a convoluted array of tubes through which a heat transfer medium circulates to exchange heat between the fluid medium and the discrete volumes of liquid; and passing the fluid medium over the outside of the tubes in the tube array to interact with the discrete volumes of liquid. The method may be used to accomplish absorption of gaseous components into the discrete volumes of liquid and cooling of the resulting interaction product.

The invention is also an apparatus useful in such a method, which apparatus features means at one elevated end of an interaction chamber to supply a liquid; means at the same end to supply a fluid medium to the chamber or remove a fluid medium from the chamber; and means to separate a liquid into discrete volumes and distribute the volumes over the cross-section of an interaction chamber filled with a convoluted array of tubes that are arranged for circulation of a fluid medium within the tubes. In a preferred embodiment, a plate is provided at said one elevated end of the interaction chamber, the plate having one set of channels distributed throughout and through which groups of the tubes are threaded before being gathered together at a tubesheet, the channels providing spaces around the tubes for passage of the liquid, the plates also having a second set of channels distributed throughout and with tubular extensions attached on the liquid supply side of the plate for passage of the gas through the plate.

DESCRIPTION OF THE INVENTION

Figures 1, 2:
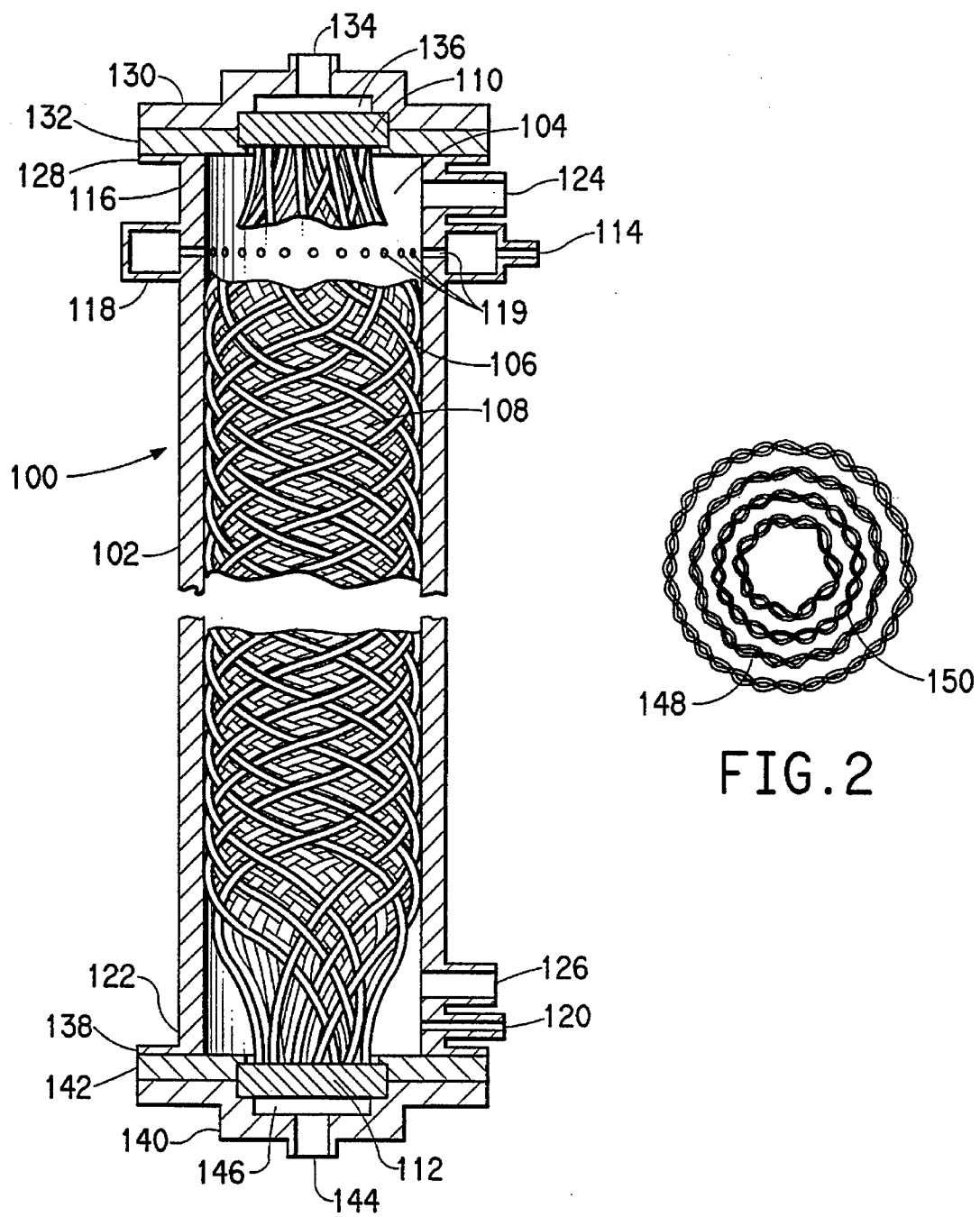
FIG. 1 is a cross-section of an embodiment where the absorbing liquid is sprayed or jetted radially into and onto the top of a single bundle of a convoluted array of tubes in the interaction chamber.
FIG. 2 is a cross-section of the bundle of tubes before assembly into the chamber.

FIG. 1 shows one embodiment of the fluid medium/liquid interaction device 100 of the invention. It consists of shell 102 which forms an elongated chamber 104 that contains a plurality of tubes, such as tube 106, arranged in an elongated, convoluted array (or tube bundle) 108 that terminates in an upper tubesheet 110 and a lower tubesheet 112. A port 114 is provided on the shell 102 in communication with an elevated end 116 of the chamber 104 for supplying a liquid thereto. Port 114 is shown connected to a manifold 118, which can be part of shell 102, which manifold contains a plurality of apertures 119 for distributing liquid around the periphery of chamber 104. The apertures direct the liquid radially onto and throughout the array of tubes 108 at the elevated end 116 of the chamber. The array of tubes 108 essentially fills the cross-section of the elongated chamber 104 thereby blocking straight pathways for the liquid through the chamber. When the liquid issues from the plurality of apertures 119 it is distributed over the horizontal cross-section of the chamber 104, and it may be separated into a plurality of discrete volumes, and as it contacts the convoluted array of tubes, the liquid is further separated into a plurality of discrete volumes distributed throughout the array. Since the volumes cannot flow in a straight pathway through the array, the liquid continues to be broken into discrete volumes as it falls, or cascades, from one tube to the next and as it flows over a tube surface, rather than forming continuous streams or films or columns, as it passes down through the array by gravity. The liquid may appear like "rainfall" as it passes down through the array of tubes, and like droplets as it flows over a tube surface.

A port 124 is provided on the shell 102 in communication with the elevated end 116 of chamber 104 for supplying a fluid medium to the chamber or for removing a fluid medium from the chamber. If the fluid medium is a gas that is supplied through port 124, it would flood the chamber, distribute itself over the cross-section of the chamber, and would be passed down through the array of tubes in the presence of the liquid volumes, thereby interacting with the volumes in the presence of the tubes. It may also be that the gas is provided to the chamber by other means so that the gas would pass from the tube array and be removed from the chamber through port 124. A pressure differential applied to the fluid medium is the primary driving force passing the fluid medium through the tube array.

A port 120 is provided on the shell 102 in communication with a lower end 122 of the chamber 104, for removing liquid from the chamber at a rate that prevents flooding of the chamber with the liquid. A separate port, such as port 126 may be provided on the shell 102 in communication with the lower end 122 of the chamber 104 for supplying a fluid medium to the chamber or for removing a fluid medium from the chamber. If the fluid medium is a gas and it is desired to have co-current flow of the gas with the liquid, port 124 would be provided for supplying the gas, and port 126 could be used for removing the gas from the chamber after interaction; or alternatively, port 126 could be eliminated and port 120 could be used for removing both the interacted liquid and gas. If counter-current flow is desired, port 126 would be provided for supplying the gas and port 124 would be used for removing the interacted gas. In the embodiment shown, it is preferred to have both ports 124 and 126 provided for supplying and removing the fluid medium from the chamber.

Shell 102 has flange 128 at the elevated end 116 for assembly with cap 130. The tubesheet 110 is held in split ring assembly 132 which is clamped between cap 130 and flange 128; a U-shape cross-sectioned gasket (not shown) effects sealing between the tubesheet, flange and cap. Cap 130 has port 134 in communication with cavity 136 in the cap that is in communication with the open ends of tubes 106 in the tubesheet 110. The opposite end of the elongated shell is similarly provided with flange 138, cap 140 and split ring 142 for support of tubesheet 112. Cap 140 similarly has port 144 communicating with cavity 146 for communication with the open ends of tubes 106 in tubesheet 112. Ports 134 and 144 provide an inlet and outlet for a heat transfer medium that flows through the inside bores of tubes 106 in the convoluted array 108. Split ring assemblies 132 and 142 can be disassembled into two half rings so the tube bundle with attached tubesheets can be easily disassembled and removed from the chamber 104 in shell 102, since the tubesheet diameter is less than the chamber diameter.

The convoluted array of tubes, or tube bundle, can be formed by entangling the plurality of tubes randomly; or by forming each tube into a helix and placing the helixes side-by-side in an overlapping relation, such as is suggested by Ymes in U.S. Pat. No. 4,909,318; or by braiding the tubes and arranging them as is suggested by Baker in U.S. Pat. No. 3,419,069, which is incorporated herein by reference; or by some other means that fills the cross-section of the chamber and blocks straight pathways through the elongated chamber and provides passages between the outer surfaces of the tubes for flow of a liquid and gas. FIG. 2 shows a cross-section of an arrangement of braided tubes before assembly with the shell, where the tubes are braided into sleeves, such as sleeves 148 and 150, which are shown spaced apart for assembly one inside the other. The sleeves would then have a slight tension applied to collapse the sleeves together (like a Chinese finger puzzle) to form a compact bundle of tubes for packing within shell 102. Alternatively, the tubes may be braided into a mat which is rolled up on itself into a "jelly-roll" to form a compact bundle; or some combination of sleeve and jelly-roll arrangement may be used such as by rolling a braided mat of tubes around the collapsed sleeves to increase the diameter of the compact bundle. The braided array provides a convoluted path for the liquid and the fluid medium and provides a large contact area for the fluid medium and liquid to interact. The braiding makes a mechanically stable array of the flexible small tubes, e.g. 3.2 mm outside diameter and 2.5 mm inside diameter, that otherwise may bunch up or separate into less effective configurations, or be agitated by the fluid medium flow so mechanical failure of the individual tubes may occur.

The material of the tubes may be metal or polymer, e.g. plastic or elastomer, or any relatively impermeable tubular material that can be arranged in a convoluted array that blocks straight pathways through the chamber when assembled therewith. When the polymer of which the tubes are made is plastic, the preferred plastic is fluoropolymer resin. One example of such resin is the family of tetrafluoroethylene (TFE) polymers, including homopolymers of TFE and copolymers with at least one other comonomer. Polytetrafluoroethylene and copolymers of TFE with small concentrations of copolymerizable modifying monomers provide resins which are non-melt fabricable (modified PTFE) and which can be used in the present invention. Another example of such resin is the family of melt-fabricable TFE polymers, in which one or more comonomers are present in sufficient amount to render the resultant polymer fabricable by melt processing techniques, e.g. perfluoroolefins containing from 3 to 8 carbon atoms, such as hexafluoropropylene, perfluoro(alkyl vinyl ether) wherein the alkyl group contains 1 to 5 carbon atoms, preferably perfluoro(propyl vinyl ether), and ethylene. Additional examples of such resin include the chlorotrifluoroethylene (CTFE) polymers, including CTFE/ethylene copolymer, and vinylidene fluoride polymers, such as vinylidene fluoride homopolymer and copolymers thereof with perfluoroolefins. These resins are well known in the art. Most preferably, the plastic is a fluoropolymer resin with improved heat transfer characteristics obtained by the incorporation of filler particles to the resin such as described by Reilly in U.S. Pat. No. 3,848,660 and U.S. Pat. No. Re. 31,732 which are incorporated by reference. The filled resin composition preferably contains 5 to 45% by weight of filler particles having a thermal conductivity substantially greater than the thermal conductivity of the resin; preferably the filler particles are graphite or carbon filler particles which are impervious to corrosive fluids. Examples of elastomers include the fluoroelastomers such as copolymers of vinylidene fluoride with such monomers as hexafluoropropylene (HFP), perfluoro-(alkyl vinyl ether), notably perfluoro(methyl vinyl ether), and CTFE. TFE monomer may also be present in the vinylidene fluoride/HFP copolymer elastomer. Additonal examples of elastomers include the copolymers of TFE with such monomers as HFP, perfluoro(alkyl vinyl ether), and propylene. Vinylidene fluoride monomer may also be present in the TFE/HFP copolymer elastomer. One skilled in the art will recognize that many other plastics, elastomers and compositions can be used as the material of construction of the tubes used in the present invention, especially for the many different applications of the present invention.

It is contemplated that the apparatus of the invention can be used in a variety of ways for interacting a fluid medium and a liquid within a chamber and transferring heat to or from the liquid. The apparatus combines the functions of mass transfer and heat transfer by using "packing" in the form of a convoluted array of tubes that can be internally heated or cooled so as to drive the mass transfer. For instance, the interaction may be a mass transfer process where the fluid medium is a gas supplied from a source outside the chamber and components of the gas are absorbed into the liquid and a heat of absorption is transferred from the liquid. Alternatively, the liquid may have components that are to be desorbed out of the liquid to a gas supplied from a source outside the chamber, the desorption driven by transferring heat to the liquid. In these cases, there is required at an elevated end of the elongated interaction chamber a port for supplying liquid to the chamber and a port for supplying gas to the chamber or for removing gas from the chamber. Alternatively, the device may be part of a distillation or evaporation process where the fluid medium may be a gas that is driven out of the liquid by transferring heat to the liquid. In these cases, there is required at an elevated end of the elongated chamber a port for supplying liquid to the chamber and a port for removing gas from the chamber. The gas is provided to the chamber by being incorporated in the liquid supplied to the chamber and being liberated from the liquid within the chamber. The device may also be part of a condensation process where it is desired to condense a gas supplied to the chamber into a separate supply of liquid by transferring heat out of the liquid. In another instance, the interaction may be a chemical reaction where it is desireable to bring together a gas and a liquid for a chemical reaction where it is useful to drive the reaction by transferring heat to or from the liquid. In all cases there is at least one port required at the lower end of the elongated chamber for removing an interaction product from the chamber. In some cases it is desireable to provide a second port at the lower end for supplying a fluid medium or for separately removing another interaction product.

It is also contemplated that the fluid medium may be a liquid that has a density less than said liquid which is distributed as discrete volumes in the chamber. The lower density liquid would flood the chamber, as did the gas discussed in the above instances, and the discrete volumes of higher density liquid would pass down through the lower density liquid by gravity flow. The two liquids would be mixed and their interaction would be driven by transferring heat to or from the liquids by their contact with the array of tubes. The two liquids may be immiscible. Such a liquid-liquid system of interaction may be useful for a biological interaction for treating waste streams or producing biologically derived products where the addition or removal of heat is desired to drive the biological process.

The method of operating the apparatus of FIG. 1 in an absorption interaction process will be described by way of an example where a process for producing tetrafluoroethylene also produces a byproduct stream containing anhydrous HCl that must be converted to aqueous HCl for neutralization and disposal or use. The byproduct gas is supplied to the apparatus of the invention and the conversion occurs by absorption in water or dilute acid which produces heat that must be removed for disposal or use. The gas product stream passing from the apparatus is scrubbed before releasing it to the environment. Referring to FIG. 1, the byproduct gas is supplied to the elevated end 116 of interaction chamber 104 through port 124. The temperature of the gas may be below ambient or the gas may be as hot as 300–400 degrees F. A dilute acid liquid is supplied to the elevated end of the chamber through port 114, manifold 118 and through apertures 119. The temperature of the liquid may be below ambient or as hot as 300–400 degrees F. The liquid is distributed over the cross-section of the chamber by spraying the liquid radially as droplets onto the elevated end of the array 108 of convoluted tubes. As the liquid contacts the tubes and passes down through the tubes it is further distributed and separated into discrete volumes which may be droplets or slugs of liquid that "rain" down through the array. In addition, it is believed to be advantageous that the surface tension of liquid on the tube surface is such that the liquid does not wet the tube, but rather tends to "bead up". To accomplish this with a variety of liquids, it is preferrable to have a tube surface that is a fluoropolymer resin; preferably the entire tube is a fluoropolymer resin. It is believed that this beading up increases the plurality of discrete volumes distributed throughout the tubes of the array to provide a large surface area for exposure to the gas and to the influence of the heat transfer medium in the tubes. It is believed that the surface area and the heat transfer contact with the tubes is enhanced with beading versus a situation where the liquid completely wets and forms a thin film on the surface of the tubes. Tests with an apparatus having fluoropolymer resin tubes and a dilute acid liquid have shown surprisingly high productivity and production rates for the volumetric size of the apparatus.

The absorption of HCl from the gas into the discrete liquid volumes produces significant heating of the liquid. This heat is transferred from the liquid volumes to a heat transfer medium, such as chilled water, that is supplied to the lower end of the apparatus through port 144 where it flows through cavity 146 and through tubesheet 112 into the bores of tubes 106. The water flows up through the bores of the tubes in the convoluted tube array 108, thereby transferring heat from the liquid volumes to the water, and through tubesheet 110 and cavity 136 and through port 134, thereby removing heat from the chamber. The maximum pressure of the water in the bores of the tubes is limited by the maximum operating temperature of the fluoropolymer resin or other material comprising the tubes; the maximum pressure of the gas in the chamber 104 is also so limited.

The liquid cascades down through passages between the tubes in the tube bundle 108 and becomes a more concentrated acid solution until it reaches a level of about 30%–36% HCl at the lower end 122 of the chamber 104. This product then is removed from the chamber through port 120. The gas also passes through passages between the tubes in the tube bundle and the gas product (a waste gas with most of the anhydrous HCl removed) is removed from the chamber through port 126 which is above port 120. If desired, the liquid product and gas product could both be removed from the chamber through a single port, such as port 120, since they are flowing co-currently in this example, and they could be segregated outside the chamber.

Figure 4:
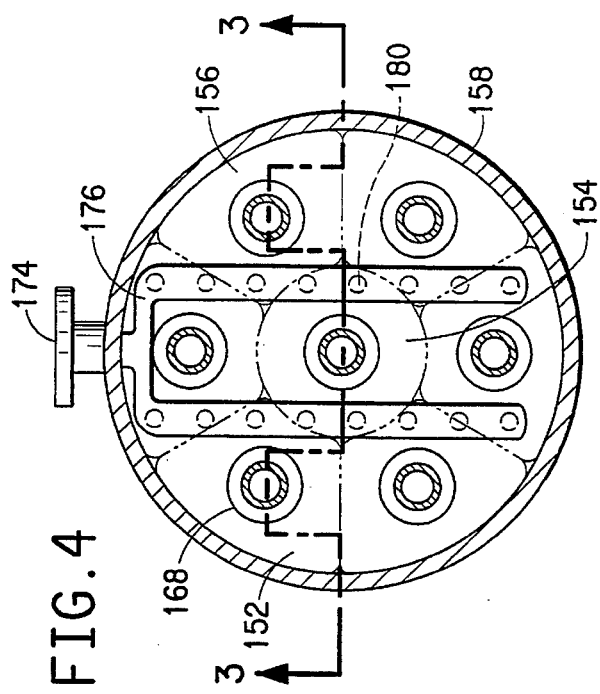
FIG. 4 is a cross-section taken along 4—4 of FIG. 3 showing how the bundles and distribution manifold fit in the chamber.
Figure 3:
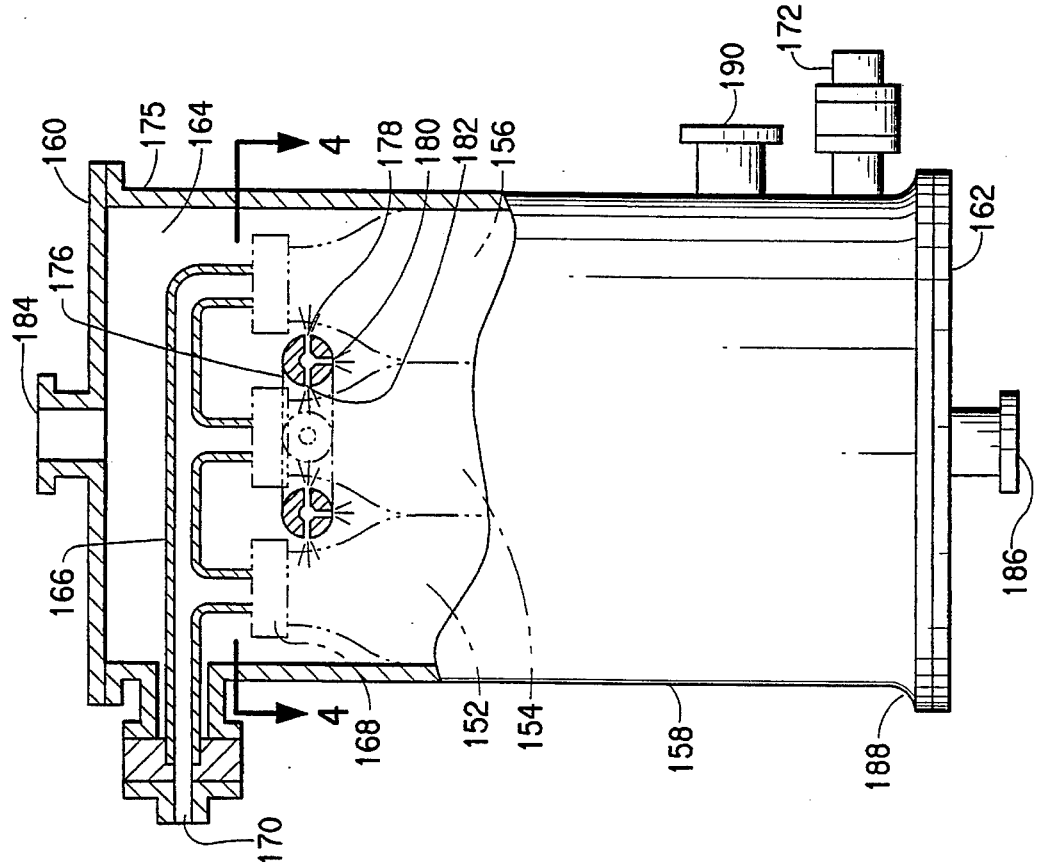
FIG. 3 is a partial cross-section of an embodiment showing spraying or jetting from a distribution manifold inserted between several bundles of tubes in the interaction chamber.

FIGS. 3 and 4 show an alternate embodiment where several bundles of tubes, such as bundles 152, 154, and 156, each in a convoluted array, are packed into a shell 158. The shell is closed off on the top and bottom ends with end caps 160 and 162 respectively to define an enclosed elongated chamber 164 where a fluid medium and liquid interact. A manifold 166 for a heat transfer medium is attached to each bundle of tubes at a tubesheet, such as tubesheet 168 for bundle 152, and the manifold is attached to and in fluid communication with port 170 for passing a heat transfer medium through the tubes in the bundles. In this embodiment, the tubes of each bundle of tubes are arranged at this elevated end of the chamber (and convoluted array of tubes) in a plurality of groups corresponding to the number of bundles and these groups are distributed over the cross-section of the chamber. There is a similar manifold (not shown) attached to the opposite end of the bundles, such as bundles 152, 154, and 156, and which is attached to and in fluid communication with port 172 for passing the heat transfer medium through the tubes in the bundles. A port 174 (FIG. 4) is provided on the elevated end 175 of the shell 158 and is attached to and in fluid communication with a liquid distribution manifold 176 that is placed among the upper ends of the tube bundles. The distribution manifold 176 has apertures, such as 178, 180, and 182, along its length for supplying liquid distributed over the cross-section of the chamber 164. A port 184 on cap 160 at the elevated end 175 of the chamber 164 is provided for supplying a fluid medium to the chamber or for removing a fluid medium from the chamber. A port 186 on cap 162 at the lower end 188 of chamber 164 is provided for removing an interaction product from the chamber, such as a liquid interaction product, or both a liquid and fluid medium interaction product. A port 190 on shell 158 may also be provided for supplying the fluid medium to the lower end 188 of the chamber or for removing a fluid medium interaction product from the chamber.

Figure 5:
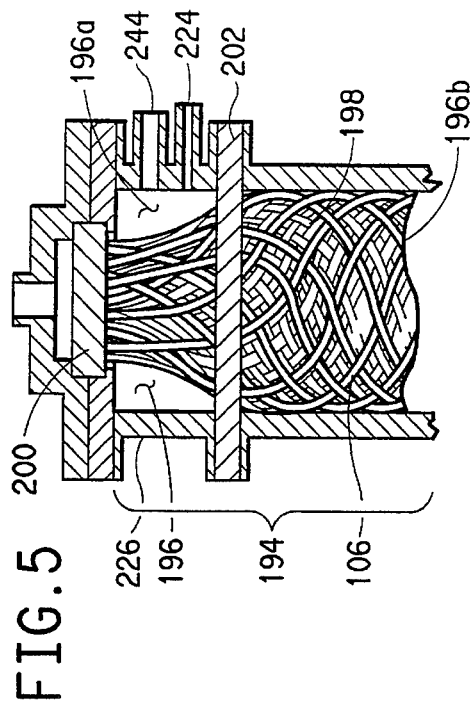
FIG. 5 is a partial cross-section of an embodiment where the tubes are threaded through channels in a liquid and fluid medium distributor plate at one end of a single bundle of tubes.
Figure 6:
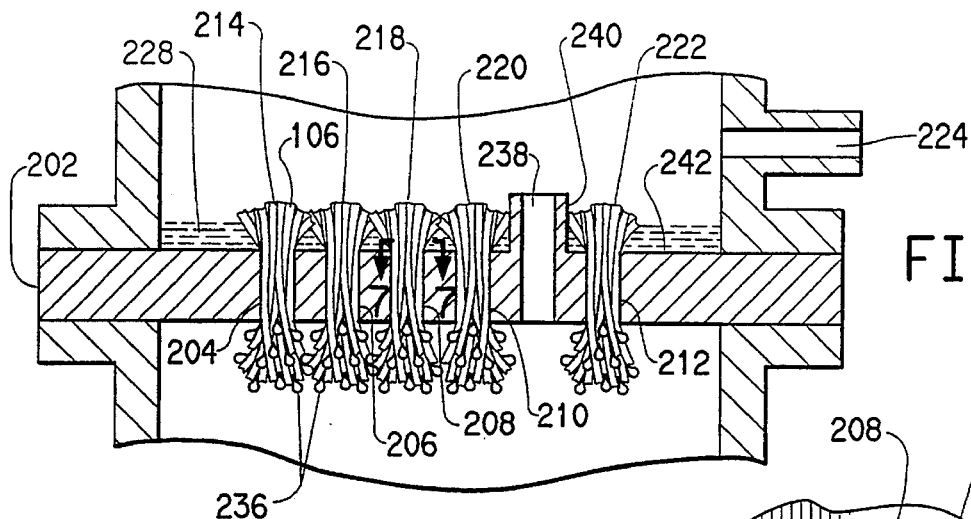
FIG. 6 is an enlarged cross-section of a portion of FIG. 5 taken through the distributor plate along 6—6 of FIG. 8.
Figure 7:
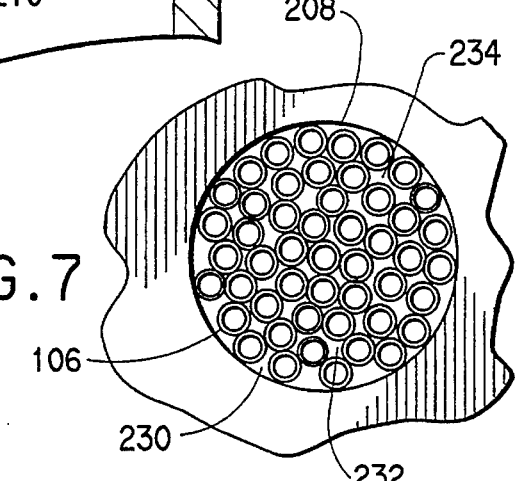
FIG. 7 is a top view along 7—7 of FIG. 6 showing a group of tubes in a channel of the distributor plate.

FIGS. 5, 6, 7, and 8 show another alternate embodiment of the invention where the liquid is distributed and separated into discrete volumes by use of a distributor plate adjacent the means for supplying the liquid. FIG. 5 shows the top portion of a shell 194 containing interaction chamber 196. The bottom end of the shell and chamber are not shown, but may be the same as the shell and chamber of FIG. 1. The chamber 196 contains a convoluted array of tubes 198 that is terminated in a tubesheet, such as 200, at both ends, similar to FIG. 1. The tubesheet is assembled with shell 194 in a manner which is the same as was the tubesheets for the bundle of FIG. 1. There is a distributor plate 202 sealingly attached to shell 194, as seen in FIGS. 5 and 6, which contains a first plurality of channels, such as 204, 206, 208, 210, and 212 distributed over the cross-section of the chamber and through which groups of tubes divided from the tube array are threaded before the ends of the tubes are terminated in tubesheet 200. Hence, the distributor plate is also attached to the tube bundle 198 by its threading engagement with the tubes. The distributor plate therefore separates the tubes in the bundle into a plurality of groups, such as groups 214, 216, 218, 220, and 222, that are distributed over the cross-section of the chamber. There is a port 224 which is the means for supplying liquid to the elevated end 226 of the chamber 196. The liquid contacts the distributor plate 202 and collects in a pool of liquid 228 that is distributed over the cross-section of the chamber 196. The liquid then flows through the first channels 204, 206, 208, 210, and 212 by flowing through the plurality of interstices between the individual tubes in each group of tubes, and between the tubes and the channels. FIG. 7 shows how the tubes, such as 106 may be packed in a first channel, such as 208, to leave the plurality of interstices, such as 230 between the tube and channel, and such as 232 and 234 between adjacent tubes. The flow of the liquid is supplied at such a rate that the liquid pools up to a depth that forces the liquid through the interstices at a total rate that equals the flow rate supplied, so the level of the pool remains substantially constant. As the pool becomes deeper, the interstices at the center of the group of tubes becomes more easily accessible as the tubes are more loosely held against one another as they are positioned further from the distributor plate, so a deeper pool accomodates a higher flow rate and vice-versa. The packing of a group of tubes in a first channel of the distributor plate must be done in such a way as to provide sufficient interstices so all the first channels together handle the desired flow rate of the liquid supplied. Sufficient pool depth is needed to insure the liquid is distributed across the distributor plate 202 instead of just being present near the liquid inlet port 224. A pool is a simple means of distributing the liquid which does not require special liquid pumping devices to establish a spray of liquid through a small orifice which may become clogged with debris in the liquid or deposits that build up with use.

When the liquid flows through the interstices in the first channels of the distributor plate, which also defines channels for the pool liquid 228, the liquid is separated into discrete volumes as it flows along the tubes which are bent and twisted and crossed in the convoluted array. The liquid continues to be broken into discrete volumes as it falls from one tube to the next, and the formation of discrete volumes may be enhanced if the liquid beads up on the tube surface as discussed above with reference to FIG. 1. Droplets, such as 236 on tube group 218 (FIG. 6), represent such discrete liquid volumes that are believed to "rain" down through the array of tubes.

Distributor plate 202 has a second plurality of channels, such as channel 238 in FIG. 6, distributed over the cross-section of the chamber and extending through the plate for passing (flow of) the fluid medium through the plate. The second channels each have a tubular extension, such as 240, extending away from the side 242 of the plate facing and towards the liquid supply port 224. The length of the extension 240 is such that it always extends above the top level of pool 228 so an unobstructed passage is provided for the fluid medium through the distributor plate. Under some conditions of low liquid flow, some of the fluid medium may also pass through the interstices in the first channels, such as first channel 218.

For some situations it may be useful to also have tubular extensions attached to the first channels that extend to a level just above the desired top level of the pool and below the end of the tubular extensions 240 for the fluid medium. These extensions could also have "V" notches in the top end to help control the flow rate of liquid from the pool through the first channels. When such tubular extensions are used with the first channels, the packing of the group of tubes in a first channel is less critical and larger interstices can be provided since the pool level would be controlled by the tubular extensions on the first channels; with larger interstices, more of the fluid medium may pass through the first channels with the liquid.

Figure 8:
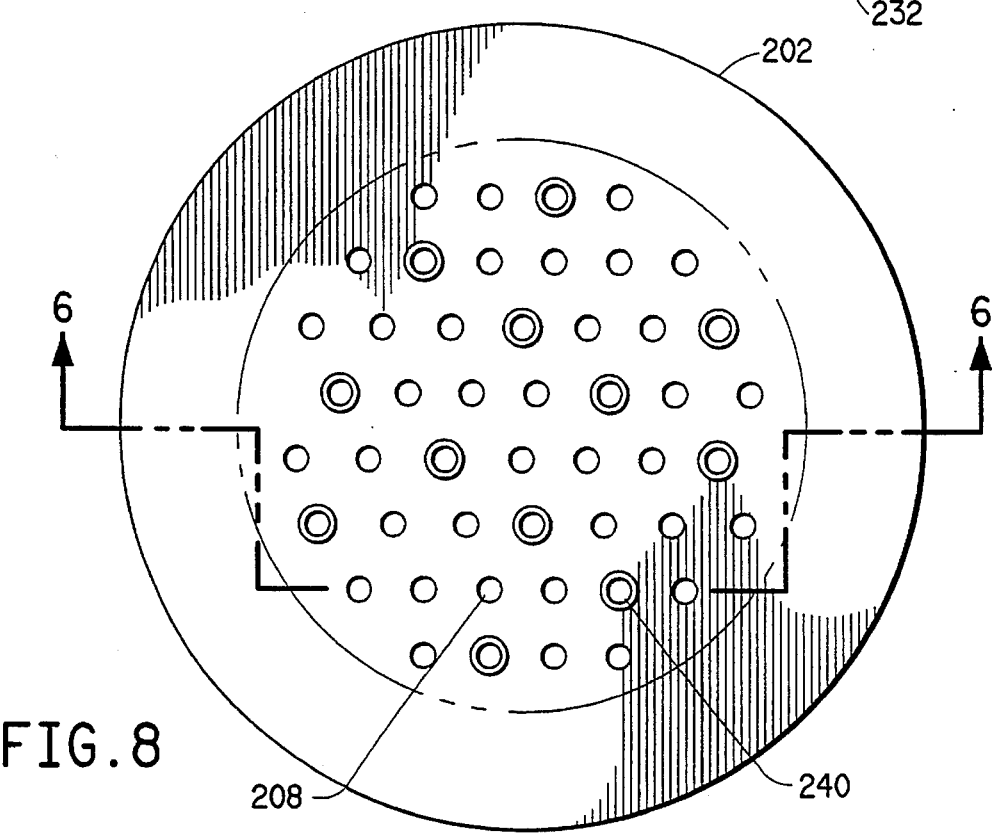
FIG. 8 is a top view of a distributor plate showing one configuration of liquid channels and fluid medium channels.

FIG. 8 shows an embodiment of the distributor plate 202 in which the array of first channels, such as 208, are distributed over the plate in a regular array. The second channel tubular extensions, such as 240, for the fluid medium are also distributed over the plate among the first channels, such as 208, for the liquid and groups of tubes. Other arrangements, such as alternating concentric rings for the first and second channels, are also possible. It may be desirable for simplicity of assembly to have a braided tube array where groups of tubes comprise the braid elements, such as groups of 30–50 tubes, that are braided with other groups to form the array. The distributor plate would then have the same number of first channels as there are braid elements; one braid element would be threaded through each first channel. The tubes after being threaded through the distributor plate 202 may be gathered in a straight array to the tubesheet, or they may continue to be braided in a convolute array to the tubesheet. At the upper and lower ends of the tube array, the braid elements are gathered together into a tight compacted bundle which is then heated to fuse the tubes together and form a sealed tubesheet, such as tubesheet 200, through which the fluid medium and liquid outside the tubes cannot flow. Such a tubesheet is disclosed in U.S. Pat. No. 3,315,740 which is incorporated herein by reference.

Referring to FIG. 5, there is a port 244 provided on the shell 194 in communication with the elevated end 226 of the interaction chamber 196 for supplying the fluid medium to the chamber or for removing the fluid medium from the chamber. Port 244 is on the same side of the distributor plate 202 as port 224. The distributor plate 202 divides the chamber 196 into an upper chamber portion 196a and a lower chamber portion 196b. Ports 224 and 244 are in communication with the upper chamber 196a. Pool 228 is in upper chamber 196a. The liquid volumes and the fluid medium interact in the presence of the convoluted array of tubes in lower chamber 196b. Such compartmentalization of chamber 196 may be useful if other fluids are to be added to a portion of the chamber only where the interaction is taking place or only where it is not.

In the embodiment of FIGS. 5–8, the tubes at the elevated end of the convoluted array of tubes are distributed as a plurality of groups of tubes over the cross-section of the chamber, the liquid is separated into discrete volumes and distributed over the cross-section of the chamber by forming a pool of the liquid above the tube array and dripping the liquid through a plurality of channels in the pool and onto the surface of the tubes in the array, the channels distributed throughout the pool. In this embodiment the distributing of tubes comprises passing each group of tubes through one of the channels in the pool.

The apparatus of FIGS. 5–8 was used as a cooler/absorber in a manner similar to the example stated above for handling a process waste gas, and it was compared in a side-by-side test to a conventional falling film cooler/absorber device employing impervious graphite tubes as discussed in the background of the invention. For similar units occupying the same volumetric space, and run under similar operating conditions of gas, liquid, and heat transfer medium flows, temperatures, and compositions, the FIG. 5 apparatus and method of the invention unexpectedly provided better than 2× the output of products as did the conventional device.

Figure 9:
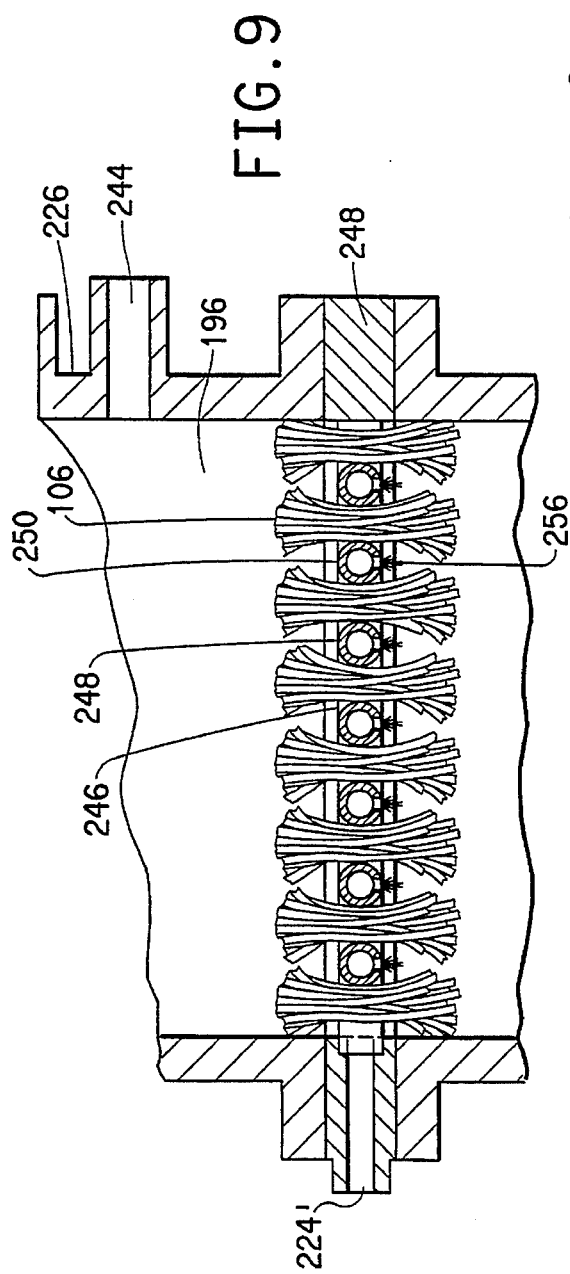
FIG. 9 is a cross-section similar to FIG. 6, except showing an embodiment where the tubes are threaded through a ladder-type distributor for distributing the liquid and spraying or jetting it over the cross-section of the chamber.
Figure 10:
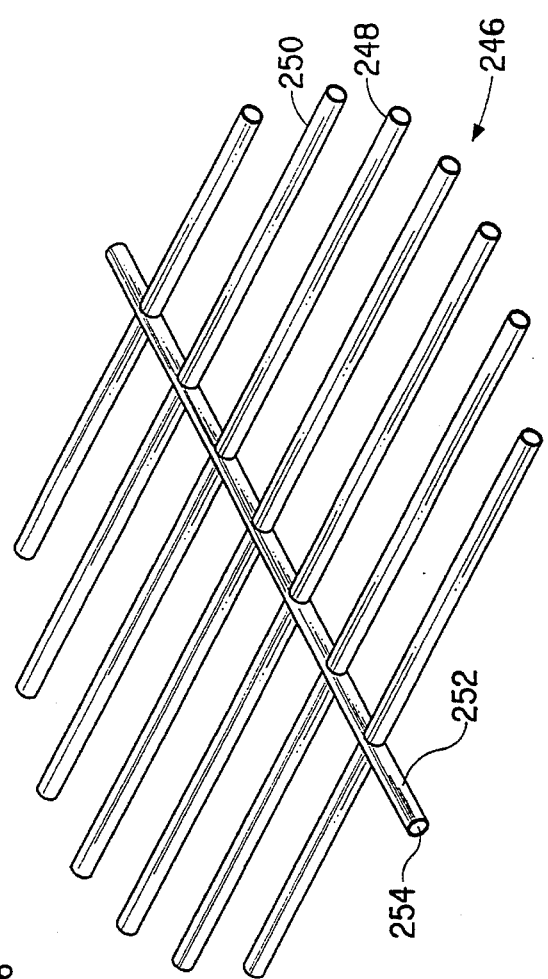
FIG. 10 is an isometric view of the ladder-type distributor of FIG. 9.

FIGS. 9 and 10 show another embodiment which is a modification of FIGS. 5 and 6 where the means for distributing the liquid over the cross-section of the chamber comprises a ladder-type distributor 246 mounted on a support ring 248 which replaces the distributor plate 202 in FIGS. 5 and 6. FIG. 10 shows the configuration of a ladder-type distributor 246 for a cylindrical chamber. The distributor 246 is comprised of closed-end hollow pipe arms, such as arms 248 and 250 that are attached to a central hollow pipe 252. The hollow bores of the pipes all are in communication with opening 254 in central pipe 252. Each pipe arm has apertures along its length, such as aperture 256 in arm 250, for spraying fluid out under pressure. The liquid supply 224' is located in the support ring 248 and is in communication with opening 254 and thereby with all the apertures, such as 256, for supply of liquid over the cross-section of the chamber 196. The tubes 106 in the array are threaded through the arms, such as arms 248 and 250, during fabrication of the array and before the tubes are sealed in the tubesheet 200 (FIG. 5). The ladder-type distributor is located at the elevated end 226 of the chamber 196 just below the fluid medium port 244. In operation, the liquid sprayed from the apertures of the ladder-type distributor would be separated into discrete volumes and distributed over the cross-section of the chamber and would pass down through the array of tubes. The fluid medium would pass through the interstices between the tubes threaded through the ladder-type distributor so the fluid medium could pass between the convoluted array 198 (FIG. 5) and the fluid medium port 244.

What is claimed is:

1. A method of interacting a fluid medium and a liquid within a chamber, whereby the liquid is heated or cooled as a result of said interaction, and simultaneously cooling or heating, respectively, the liquid with a heat transfer medium, comprising the steps of:

a) placing a plurality of tubes in a convoluted array having passages therebetween, the array essentially filling the cross-section of the chamber thereby blocking straight pathways for the fluid medium and liquid through the chamber;

b) supplying the liquid into an elevated end of the chamber and separating the liquid into a plurality of discrete volumes;

c) distributing the liquid volumes over the cross-section of the chamber;

d) passing the distributed liquid volumes through the passages in the array and over the outside surfaces of the tubes by gravity flow;

e) providing the fluid medium distributed over the cross-section of the chamber in the presence of the distributed liquid volumes, whereby the liquid and fluid medium interact in the presence of the tubes;

f) passing a heat transfer medium through each of the tubes and to the exterior of said chamber, whereby the heating or cooling of the interaction is transferred through the tubes and to the heat transfer medium which is thereby removed from the chamber; and g) removing the interaction product from the chamber.

2. The method of claim 1 whereby the fluid medium is a liquid medium having a density lower than said liquid and the step of providing the fluid medium to the chamber comprises flooding the chamber with said lower density liquid medium.

3. The method of claim 1, whereby the fluid medium is a gas and the step of providing the fluid medium to the chamber comprises providing said gas to the chamber from a separate supply.

4. The method of claim 1, whereby the fluid medium is a gas and the step of providing the fluid medium to the chamber comprises providing said gas to the chamber by a process of mass transfer from said liquid.

5. The method of claim 1, whereby placing a plurality of tubes in the chamber comprises placing polymer tubes in the chamber.

6. The method of claim 1 whereby passing the liquid volumes and fluid medium through the array of tubes comprises passing the fluid medium co-currently with the liquid, and the heat transfer of the interaction comprises heating of the liquid.

7. The method of claim 1 whereby separating the liquid into discrete volumes includes forming discrete droplets of the liquid on the surface of the tubes by providing a tubing surface that is non-wettable by the liquid.

8. The method of claim 7 whereby providing a tube surface that is non-wettable by the liquid comprises providing a fluoropolymer resin tube surface.

9. The method of claim 8 wherein the providing of a fluoropolymer resin tube surface includes incorporative 5 to 45 percent by weight of filler particles into said resin, said filler particles having a thermal conductivity substantially greater than the thermal conductivity of the fluoropolymer resin.

10. The method of claim 9, wherein providing the addition of a filler comprises providing a graphite or carbon filler.

11. The method of claim 1 including arranging the tubes at the elevated end of the convoluted array in a plurality of groups of one or more tubes, and distributing the groups over the cross-section of the chamber.

12. The method of claim 11 whereby the liquid is separated into discrete volumes and distributed over the cross-section of the chamber by forming a pool of the liquid above the tube array and dripping the liquid through a plurality of channels in the pool and onto the surface of the tubes in the array, the channels distributed throughout the pool.

13. The method of claim 12 whereby distributing the groups of tubes comprises passing each group of tubes through one of the channels in the pool.

14. A method for absorbing components from a gas into a liquid and transferring heat to or from the liquid, comprising the steps of:

(a) supplying a liquid, which selectively absorbs components of the gas, into the upper end of an elongated chamber;

(b) forming a plurality of discrete volumes of said liquid and distributing the discrete volumes throughout the cross-section of the elongated chamber;

(c) placing an elongated, convoluted array of a plurality of tubes in the elongated chamber, the array filling the cross-section of the chamber and blocking straight pathways for the liquid and gas through the elongated length of the chamber, the array having passages therethrough between the convoluted tubes, and the array of tubes gathered together at a tubesheet at each opposed end;

(d) passing the discrete volumes of liquid downwardly by gravity flow through the elongated array and over the outside of the plurality of tubes of the elongated array;

(e) passing the gases through the elongated array over the outside of the plurality of tubes, thereby exposing the discrete volumes of liquid to the gas for absorption in the presence of the tubes;

(f) passing a heat transfer medium through one tubesheet, inside of the tubes of the array, and through the other tubesheet, thereby transferring heat between the heat transfer medium and the discrete volumes of liquid passing over the outside of the tubes; and (g) removing the absorption product from the chamber.

15. A method for interacting a fluid medium and a liquid and transferring heat to or from the liquid, comprising the steps of:

(a) supplying a liquid, which interacts with the fluid medium, into the upper end of an elongated chamber;

(b) forming a plurality of discrete volumes of said liquid and distributing the discrete volumes throughout the cross-section of the elongated chamber;

(c) placing an elongated, convoluted array of a plurality of tubes in the elongated chamber, the array filling the cross-section of the chamber and blocking straight pathways for the liquid through the elongated length of the chamber, the array having passages for the liquid and fluid medium therethrough between the convoluted tubes, and the array of tubes gathered together at a tubesheet at each opposed end;

(d) passing the discrete volumes of liquid downwardly under gravity flow through the elongated array and over the outside of the plurality of tubes of the elongated array thereby interacting the discrete volumes of liquid and the fluid medium in the presence of the tubes;

(e) passing the fluid medium through the elongated array over the outside of the plurality of tubes;

(f) passing a heat transfer medium through one tubesheet, inside of the tubes of the array, and through the other tubesheet, thereby transferring heat between the heat transfer medium and the discrete volumes of liquid passing over the outside of the tubes; and (g) removing the interaction product from the chamber.

16. The method of claim 15, whereby passing a heat transfer medium through the tubes comprises passing a heated medium through the tubes thereby heating the discrete volumes of liquid and driving an interaction whereby there is a mass transfer of fluid medium out of the liquid.

17. The method of claim 15, whereby passing a heat transfer medium through the tubes comprises passing a cooled medium through the tubes thereby cooling the discrete volumes of liquid and driving an interaction, whereby there is a mass transfer of fluid medium into the liquid.

18. The method of claim 15, whereby passing a heat transfer medium through the tubes comprises passing a heated medium through the tubes thereby heating the discrete volumes of liquid and driving a chemical reaction between the fluid medium and the liquid.

19. The method of claim 15, whereby passing a heat transfer medium through the tubes comprises passing a cooled medium through the tubes thereby cooling the discrete volumes of liquid and driving a chemical reaction between the fluid medium and the liquid.

20. An apparatus for interacting a fluid medium and a liquid within a chamber, and transferring heat to or from the liquid, comprising:

a shell defining an elongated chamber for interaction of a liquid and a fluid medium passing through said chamber, said shell having means for supplying said liquid to one end of said interaction chamber, and means at said one end of said chamber for supplying said fluid medium to said chamber or removing said fluid medium from said chamber, and having means for removing an interaction product thereof from the opposite end of said shell;

distribution means within said chamber for distributing the liquid as a plurality of discrete volumes over the cross-section of the chamber for flow thereof of said volumes through said interaction chamber;

a plurality of tubes within said chamber and filling the cross-section of said chamber and blocking straight pathways through said chamber, said tubes having the interior of the tubes accessible for communicating a heat exchange medium from one end to the opposed end of each tube and having the exterior of the tubes disposed to form tortuous paths for said liquid and fluid medium in said interaction chamber, thereby bringing said liquid volumes into contact with the exterior of said tubes for exposure to the heat exchange effect of said heat exchange medium and resultant interaction between said liquid and fluid medium at the exterior surface of said tubes.

21. The apparatus of claim 20 further comprising means at the opposite end of the chamber from said one end for supplying said fluid medium to the chamber or removing a product of said interaction from the chamber.

22. Apparatus of claim 20 wherein said plurality of tubes are a fluoropolymer resin non-wettable by said liquid, and said distribution means includes feeding said liquid to achieve droplets of said liquid moving over the exterior surface of said tubes, the high surface area of said moving droplets providing improved interaction with said fluid medium and improved heat transfer between said droplets and said heat exchange fluid within the interior of said tubes.

23. Apparatus of claim 20 wherein the distribution means includes a distributor plate adjacent said means for supplying said liquid, said plate having a first plurality of channels through said plate, the first channels distributed over the cross-section of the chamber, and said tubes are divided into groups with each group threaded through one of said first channels, the groups of tubes leaving a plurality of interstices in each channel for flow of said liquid through said first channels, said plate having a second plurality of channels through said plate for flow of said fluid medium, the second channels distributed over the cross-section of the chamber and having tubular extensions extending beyond said plate toward said means for supplying said liquid.

* * * * *